(12) United States Patent
Blatter et al.

(10) Patent No.: US 7,599,603 B1
(45) Date of Patent: Oct. 6, 2009

(54) UPGRADABLE ON-SCREEN DISPLAY SYSTEM

(75) Inventors: Harold Blatter, Indianapolis, IN (US); Michael Francis Kvintus, Jr., Terre Haute, IN (US); Michael Joseph McLane, Indianapolis, IN (US); Bradley Alan Sparks, Carmel, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 09/649,975

(22) Filed: Aug. 29, 2000

Related U.S. Application Data

(62) Division of application No. 09/029,807, filed on May 29, 1998, now Pat. No. 7,321,717.

(51) Int. Cl.
*H04N 5/91* (2006.01)
(52) U.S. Cl. .......................... 386/95; 386/112
(58) Field of Classification Search ................. 386/46, 386/95, 111, 112, 124, 125, 126; 348/563, 348/564, 906
See application file for complete search history.

(56) References Cited

U.S. PATENT DOCUMENTS

| | | | |
|---|---|---|---|
| 4,118,669 A | 10/1978 | Fung | |
| 4,405,946 A | 9/1983 | Knight | |
| 4,460,918 A | 7/1984 | Flasza | |
| 4,510,003 A | 4/1985 | Oliver | |
| 4,519,003 A | 5/1985 | Scholz | 358/335 |
| 4,660,073 A | 4/1987 | Baumeister | |
| 4,734,791 A | 3/1988 | Stearns et al. | 386/52 |
| 4,821,122 A | 4/1989 | Teskey | |
| 4,914,523 A | 4/1990 | Marunta | |
| 4,989,081 A * | 1/1991 | Miyagawa et al. | 348/61 |
| 5,097,348 A | 3/1992 | Suetaka | 358/335 |
| 5,097,349 A | 3/1992 | Nomura et al. | 358/335 |
| 5,315,452 A | 5/1994 | Hong | 386/46 |
| 5,377,051 A | 12/1994 | Lane et al. | |
| 5,386,247 A | 1/1995 | Shafer et al. | |
| 5,410,437 A | 4/1995 | Ogawa et al. | 386/95 |
| 5,428,400 A | 6/1995 | Landis et al. | |
| 5,515,173 A | 5/1996 | Mankovita et al. | |
| 5,598,352 A | 1/1997 | Rosenau et al. | |

(Continued)

FOREIGN PATENT DOCUMENTS

DE     2918846     11/1980

(Continued)

OTHER PUBLICATIONS

Sony Digital Videocassette Recorder Operational Manual DVW-A500/500, DVW-A500P/500P.

(Continued)

*Primary Examiner*—Huy T Nguyen
(74) *Attorney, Agent, or Firm*—Robert D. Shedd; Joseph J. Opalach; Reitseng Lin

(57) ABSTRACT

A digital television receiver comprises a receiving means having selectable first and second inputs. The first input receives a broadcast digital television signal and the second input receives a digital television signal from a reproduction apparatus, and generates a video signal for display. A generating means is coupled to the receiving means for generating a display message responsive to display message data derived from the selected input and combining the display message with said video signal.

13 Claims, 2 Drawing Sheets

U.S. PATENT DOCUMENTS

| | | | |
|---|---|---|---|
| 5,686,954 A * | 11/1997 | Yoshinobu et al. | 348/906 |
| 5,701,385 A | 12/1997 | Katsuyama et al. | 386/106 |
| 5,729,651 A | 3/1998 | Matsumoto | 386/95 |
| 5,815,634 A | 9/1998 | Daum et al. | |
| 5,841,987 A | 11/1998 | Blatter et al. | |
| 5,881,203 A | 3/1999 | Fujinami et al. | |
| 5,915,068 A * | 6/1999 | Levine | 386/46 |
| 5,937,136 A | 8/1999 | Sato | |
| 5,974,221 A | 10/1999 | Kato et al. | |
| 5,978,546 A | 11/1999 | Abe et al. | 386/124 |
| 6,034,738 A | 3/2000 | Sparks | |
| 6,177,961 B1 | 1/2001 | Blatter | |
| 6,363,213 B1 | 3/2002 | Sparks et al. | |
| 6,424,790 B1 | 7/2002 | Ishii et al. | |
| 6,765,577 B1 | 7/2004 | Tang et al. | |
| 7,239,793 B2 | 7/2007 | Sparks | |

FOREIGN PATENT DOCUMENTS

| | | |
|---|---|---|
| DE | 3104843 C2 | 8/1982 |
| EP | 0505006 A2 | 9/1992 |
| EP | 0 437 882 B1 | 4/1995 |
| EP | 0 558 120 B1 | 9/1998 |
| EP | 0 607 904 B1 | 4/1999 |
| JP | OS 153432/1980 | 11/1980 |
| JP | 05-284581 | 10/1993 |
| JP | 06-319110 | 11/1994 |
| JP | 07-079411 | 3/1995 |
| WO | WO 92/22170 | 10/1992 |

OTHER PUBLICATIONS

Sony Digital Videocassette Recorder Operational Manual DVW-A500, DVW-500.

* cited by examiner

UPGRADABLE ON-SCREEN DISPLAY SYSTEM

CROSS REFERENCE TO RELATED APPLICATIONS

This application is a division of application Ser. No. 09/029,807, filed May 29, 1998 now U.S. Pat. No. 7,321,717.

FIELD OF THE INVENTION

This invention relates to the display of digital video signals and in particular to coupling of reproduced digital video signals between equipment components.

BACKGROUND OF THE INVENTION

A digital video signal may be processed to form a bit stream having a reduced bit rate. Such processing for bit rate reduction may be implemented according to an MPEG compression method, and may be formatted, for example, with an MPEG compatible structure, such as that employed in a digital satellite system, for example DSS™ or the proposed Grand Alliance or GA terrestrial system.

A consumer video recorder may be adapted to provide recording capabilities for both analog signals and digitally encoded signals processed for example, for compatibility with an MPEG standard and having GA or DSS™ signal formats. The adapted consumer video recorder may be considered as two electronic systems within one box, sharing a recording mechanism, servo and control systems. A conventional analog recording method may be employed where an analog luminance signal component frequency modulates an RF carrier and an analog chrominance signal component amplitude modulates a second RF carrier. When reproduced, the two modulated signals are demodulated, combined and coupled out for video display.

During both record and replay operating modes, on-screen display messages may indicate operational status, warning conditions, tape duration, record time, time code etc., of the video recorder. These on-screen display messages or OSDs may be added to the analog video output signal to provide the user with recorder status information.

Digital recording may be achieved by using the consumer video recorder as a digital bit stream recorder/reproducer. The MPEG compatible bit stream, for example transport packets, may be recorded by reformatting the transport packets to facilitate recording and reproduction. For example, the transport packets may be buffered and error detection and correction data words computed and added. The bit stream with error correction added may be formatted into recording data blocks or sync blocks containing a predetermined number of bytes which may be accommodated in each recorded track. The sync block signal may be coded to render the signal more suitable for digital recording, for example, to remove any DC component, or provide spectral shaping of the recorded signal, such modulation may be produced by "code book" type encoding. In a playback mode the recording processes are effectively reversed, for example, the "code book" encoding is decoded, errors are detected and corrected and the sync block formatting is removed restoring the bit stream to the original MPEG like format.

Although system interconnection and control between a digital signal source and monitor display may be simplified by the use of a bi-directional data bus, any interconnection additional to that of an analog system may present the user with installation complexity and confusion. In addition, status or warning messages originating from the recording or reproducing device are required for on screen display during all operational modes.

U.S. Pat. No. 5,097,349, issued 17 Mar. 1992 to Pioneer, shows a system in which picture information is recorded as a subcode within audio information. The picture information may subsequently be displayed on an alpha-numeric display or a television display.

SUMMARY OF THE INVENTION

Recorder or player status, warnings or timer displays which, for reasons described above are absent during digital operating modes are advantageously provided by the following inventive arrangements. A digital television receiver comprises a receiving means having selectable first and second inputs. The first input receives a broadcast digital television signal and the second input receives a digital television signal from a reproduction apparatus, and generates a video signal for display. A generating means is coupled to the receiving means for generating a display message responsive to display message data derived from the selected input and combining the display message with said video signal.

DETAILED DESCRIPTION

Figure 1:
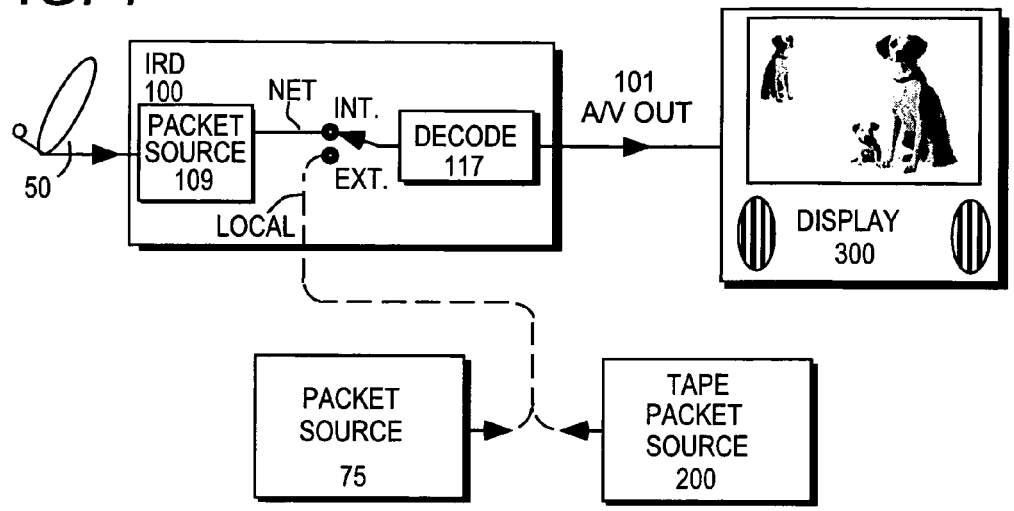
FIG. 1 depicts in block diagram form packetized signal sources coupled for decoding and display.

A simplified consumer digital audio video system is illustrated in FIG. 1. Sources of packetized, compressed audio video and control data are shown coupled for decoding and display. A receiver, IRD 100 is depicted coupled to a receiving antenna 50, however, a modulated signal may be provided from a cable distribution network (not shown). The modulated packetized signal is tuned, demodulated and a user determined program is separated within the block indicated as PACKET SOURCE 109. An output of PACKET SOURCE 109 comprises a transport packet stream of audio video and control data which is MPEG decoded to produce audio and video signals by DECODER 117. The output from DECODER 117 is coupled for monitoring by display 300. Other sources of packetized signals are shown coupled with a dotted line as alternative data streams for MPEG decoding by decoder 117. Thus DECODER 117 may be utilized to decode transport streams from external packet sources thereby reducing the cost of these other sources. For example, PACKET SOURCE 75 may represent a computer forming a packetized output signal. Such a signal may be derived from a computer memory, or may originate from an external source such as a computer network. Such a computer source may reproduce compressed audio video and control data from disk memory. In addition, PACKET SOURCE 75 may represent a digital video disk player such as, for example, a DVD format device. A further source of transport packets may be provided by a magnetic tape player recorder, PACKET SOURCE 200, which may have a format in accordance with, for example, D-VHS or DVC standards.

Figure 2:
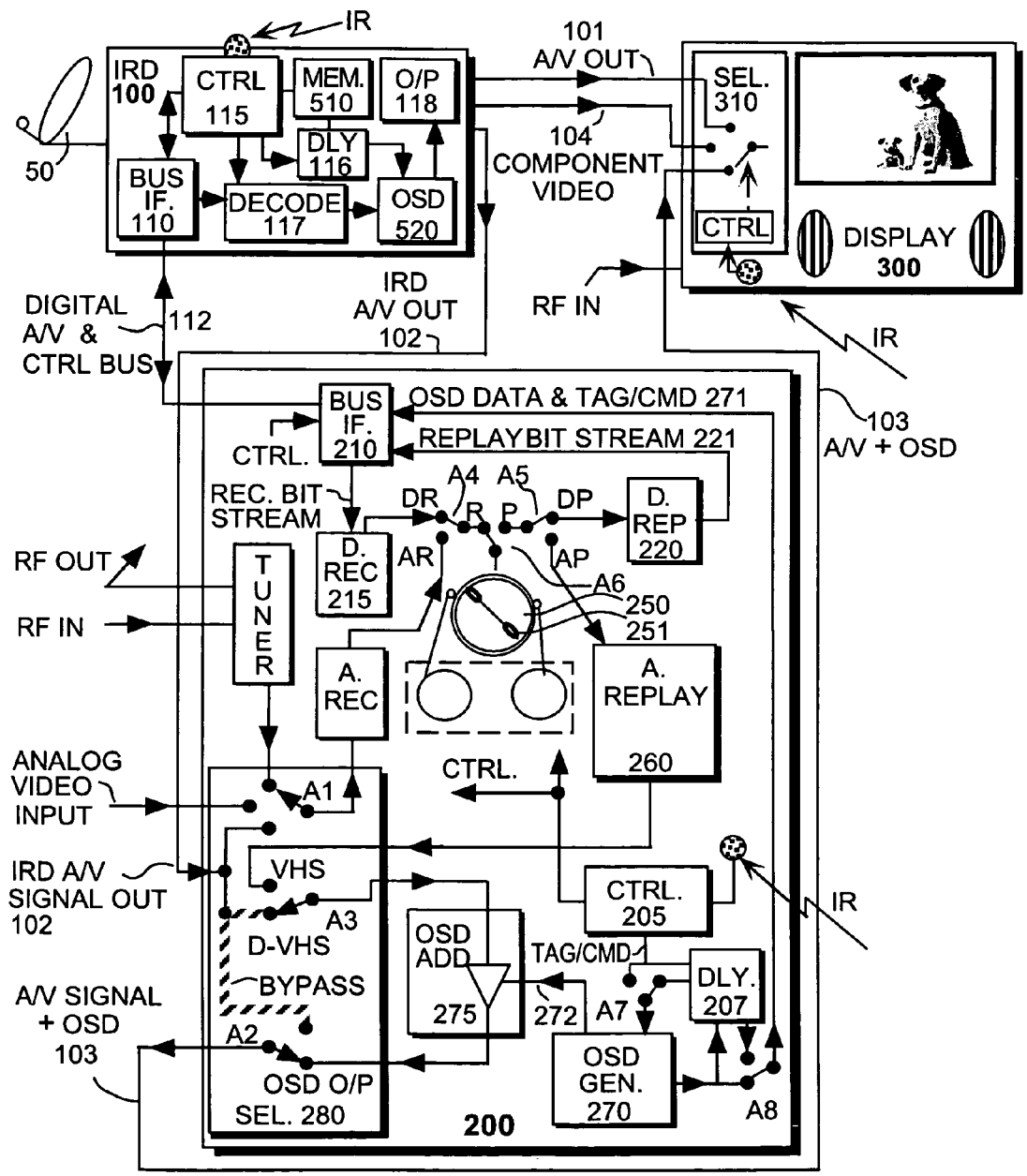
FIG. 2 shows an exemplary block diagram including various inventive embodiments.

A simplified consumer digital video receiver, recorder and display system is illustrated in the exemplary block diagram of FIG. 2. The system employs a digital video signal source, for example an integrated receiver decoder or IRD 100, an audio video monitor display device 300 and a digital video cassette recorder 200, for example employing a D-VHS or DVC format. In the illustrated system, a digital video representative signal is modulated on an RF carrier and received by an antenna 50. Antenna 50 is coupled to an integrated receiver decoder IRD 100. However, a modulated carrier may be delivered to receiver 100 by a cable distribution system (not shown). The integrated receiver decoder 100 is tuned to the RF carrier frequency and demodulates therefrom an MPEG compatible transport data stream modulation.

The transport data stream may be decoded to produce analog audio and video signals for immediate monitoring by audio video display 300. The decoded output signals are represented by signals 101 and 104, which are coupled between receiver, IRD 100 and display 300. Cost considerations may dictate that digital recorder 200 does not include MPEG encoding and decoding. Hence digital recorder 200 functions as a bit stream recorder/player, to provide time shifting or program delay capability. The omission of MPEG processing and the degree of complexity required to facilitate non-standard speed replay capability, precludes image reproduction in SHUTTLE, SLOW MOTION or TRICK-PLAY modes. Thus in summary, receiver 100 couples an MPEG compatible packet stream to digital A/V bus 112 for recording by recorder 200. Similarly a reproduced packet stream from recorder 200 is coupled back to the receiver for MPEG decoding, and audio/video generation. An additional consequence of omitting MPEG processing from the recorder is that status messages, in the form of on-screen display messages or OSDs, cannot be combined or added to the replay packetized bit stream. Thus the operational status of the recorder is not readily obvious to the user.

In addition, since recorder image data is only available during RECORD, PLAY and STOP modes, the user may be uncertain as to the responsiveness of the recorder following control commands. For example, transitioning from PLAY to REWIND may result in the replay image switching for example, to the input bit stream, a condition known as electronics to electronics or E to E, or for example, the replay image may disappear and be replaced by frozen frame derived by the IRD, or perhaps the moving image may be substituted by a colored field. Thus the user may not readily associate these visual display effects as indicia of recorder mode responsiveness.

The system illustrated in FIG. 2, shows a first inventive interconnection arrangement where a demodulated transport bit stream is coupled from receiver IRD 100 to recorder 200 via a bi-directional data bus 112. The transport packet stream is coupled to the data bus via an interface port 110 and is received at recorder 200 by means of interface port 210. The interface ports are controlled via a control data stream which is carried on a separate conductor included with data bus 112. Control signals may be derived from user input by activation of control switches (not shown), or by user generated IR remote control commands. For example, a user may chose to monitor a digital audio video signal received by dish antenna 50. The receiver may be selected by touch or via a remote control, for example IR. Receiver selection may result in the automatic monitoring the display selection, i.e. the display is automatically switched to monitor the MPEG decoded audio video outputs. The user may select a digital RECORD mode which results in coupling the received transport stream from IRD 100 via bus 112 to the recorder and initiating recording. Similarly selection of a digital recorder PLAY mode results in a replayed data stream being coupled via bus 112 for decoding by decoder 117 of receiver 100.

The MPEG compatible, packetized signal is coupled to recorder 200 and processed for recording by block D. REC. 210. A buffer memory is included in block D. REC. 210, and buffers the data stream to establish a signal more suited for recording than the packetized signal comprising bursts of data with variable duration gaps. The buffered data stream is read from the buffer to form record format sync blocks which may be encoded with error detection/correction data words. The sync block formatted data stream may be modulated for recording as described, and coupled from recording block D. REC. 210 via a selector switch A4. Selector switches A4 and A5 are controlled responsive to the selected D-VCR operating mode. For example, in FIG. 2 switches A4 and A5 are shown, for digital recording and reproduction, with switch contacts DR, digital record and DP digital playback coupling data streams to and from a rotating head assembly 250. For analog operation, switches A4 and A5 assume the alternate position as indicated by AR, analog record and AP analog playback. The sync block formatted data stream from D. REC. 210 is coupled to rotating head assembly 250 for recording on a magnetic tape.

In a PLAY mode the recorded sync block formatted data stream is reproduced from the magnetic tape by heads positioned on assembly 250. The recovered signal is demodulated by digital replay block D. Rep. 220, to remove any recording channel modulation. The replay signal is then subject to error detection and correction by means of the data words inserted prior to recording. Following error correction, the sync block formatting is removed and the bit stream restored to have substantially the same the packet format as that coupled to the recorder for recording. The packet stream from block D. Rep. 220 is coupled to interface port 210 which, responsive to the recorder PLAY mode couples the packet stream to the bi-directional data bus 112 for MPEG decoding by decoder 117.

Integrated receiver decoder 100 decodes the MPEG compatible packet stream and generates both video and audio output signals. For example, FIG. 2 illustrates video and audio output signals 101 and 102 and a component video signal 104, for example S-Video. However, these digitally reproduced video signals are without recorder status information usually provided by means of an on-screen display or OSD.

Receiver IRD 100, shown in simplified form in FIG. 2, comprises a controller, CTRL. 115, which provides overall control of the receiver, for example tuning, packet header control demultiplexing, bus interface control and selection of packet source for coupling to MPEG decoder 117. In addition the receiver status, or operational mode, may be indicated by means of an on-screen display message added to the decoded video signals. Controller 115 may construct an on-screen display message or may read a predetermined stored message from memory block MEM. 510. The on-screen display message or OSD is coupled to an OSD inserted or adder, block 520 where the message is formatted for analog video display and added or combined with the MPEG decoded video signal. The video with OSD signal is coupled out via output amplifier 118 for display by monitor display 300.

In FIG. 2 recorder player 200 includes an on-screen display generator, OSD. GEN. 270, coupled to a control system CTRL 205. In response to signals from the recorder control system 205, OSD generator 270 generates status or warning messages appropriate to the operation condition. These messages are formatted as video signals for insertion or combination with an analog video signal in block, OSD. ADD 275. Analog video signals are coupled to the on-screen display adder 275 from a video selector block SEL. 280.

Selector 280 is controlled by control system 205 and provides selection capability between various analog signal sources. For example, switch A1 provides analog input signal selection between a tuner derived signal, a baseband analog signal input and an MPEG decoded audio video output signal 102. The output from switch A1 is coupled for analog recording by block A. REC.

Selector switch A3 of SEL 280 advantageously provides selection of signal coupling to on-screen display adder 275. In FIG. 2 switch A3 is shown providing an inventive coupling of the video component of output signal 102 to the input of on-screen display adder 275. Thus, recorder player 200 status messages generated, for example during playback, may be added to video signal component 102 decoded from the output transport packet stream. Thus the digitally derived MPEG decoded replay signal with on-screen messages added, signal 103, may be viewed by display 300.

During analog operation of recorder player 200, switch A3 couples an analog replay signal, shown as signal VHS, to on-screen display adder 275. Thus during analog operation OSD messages are added to the analog replay video signal. When digital recording is selected, OSD messages may be advantageously added to the analog video signal 102 decoded from the reproduced bit stream. Thus, by means of this advantageous feedback connection recorder status messages are combined with the video component and output as analog signal 103.

Switch A2 of selector SEL. 280 advantageously provides a connection which bypasses on-screen display adder 275 and allows output signal 102 to be coupled directly to monitor display 300. Thus the bypass action of switch A2 allows viewing of decoded output signals and removes the possibility of signal degradation due to adder 275. The bypass path A2 may be automatically selected when the recorder is OFF, in a STAND BY mode, or when viewing a decoded, non-recorded "live" bit stream. To permit viewing of decoded non-recorded signals during analog recording, the bypass switch may be manually activated. The advantageous bypass connection obviates unnecessary analog recorder signal processing, for example via the E/E recorder path which inherently degrades the digitally derived signal 102. In addition the advantageous bypass function may be facilitated, for example by mechanical contact, such that switch A2 allows receiver IRD 100 to be connected to monitor display 300 without regard to the operational status of recorder 200.

On-screen display generator 270 generates messages formatted with specific horizontal and vertical synchronizing timing such that when inserted into the video signal the message is displayed at a predetermined position on the display screen. However, when operating in the digital replay mode and employing the advantageous feedback connection discussed above, OSD messages may be advantageously generated with horizontal and vertical synchronizing timing which is different from that employed during analog recorder operation. This different horizontal and vertical synchronizing timing advantageously compensates for replay signal propagation and MPEG decoding delays encountered, for example, in receiver 100. Thus, the use of different OSD synchronizing timing advantageously achieves substantially the same predetermined message position in either analog or digital recorder operation.

Processing and MPEG decoding time delays may amount to periods of multiple frames. A multiple frame delay, or temporal offset, will result in an OSD message preceding an actual reproduced visual event. This temporal offset, where the recorder OSD message precedes a reproduced event, may be revealed as a consequence of a user control command and the delayed appearance of the corresponding reproduced image effect. The temporal offset may represent a more significant problem when displaying a recorded time code signal or the recorder tape timer. For example, during tape replay specific events may be noted from an on-screen display of the recorder tape timer or an OSD of a recorded time code signal. The noted times allow for subsequent location of the selected events. However, should the noted times be used as edit points for electronic editing performed between recorders, the resultant edited scenes will precede those selected during previewing. The effect of the temporal offset between the message and the replay image may be advantageously eliminated by a delaying, message generation, message communication, OSD presentation or by modifying the tape timer/time code numbers or count. In recorder 200 a delay, depicted as DLY. 207, may be selected by switches A7 or A8. For example, when decoded video signal 102 is fed back for recorder OSD message insertion at block 275, an OSD message command may be generated responsive to controller 205. The message command signal CMD, from controller 205 is illustrated coupled to switch A7 and delay DLY 207. Switch A7 is controlled responsive to the recording mode selected for recorder 200, i.e. analog or digital. Switch A7 is shown in the digital mode, and selects a delayed version of signal CMD from delay 207. The delayed command signal results in the generation and insertion of an OSD message which is substantially coincident with decoded video signal. An alternative arrangement employs switch A8 which may insert delay 207 into the output from the OSD generator 270. In this arrangement switch A7 is connected to the output of controller 205. Switch A8 may also be employed to delay coupling of signal CMD to bus 112 and IRD 100. The temporal offset between the OSD message and the decoded replay image may also be corrected in receiver 100 by the introduction of a delay, for example as depicted by DLY. 116, into either the memory accessing signal or the memory output signal. Synchronization of repay image and OSD may be achieved by various methods, for example, by means of a delay using a clocked data latch, shift register, monostable multivibrator, etc. A tape timer or time code OSD may be synchronized with the decoded image, for example during edit mode preview by arithmetic manipulation of the display numerals. Thus the selected image and associated display numerals may be entered to enable an electronic edit to be performed. During analog operation of recorder 200 the command signal CMD, from controller 205 is not delayed and switch A7 couples directly to generator 270.

In another inventive embodiment, on-screen display messages originated by recorder 200, may advantageously utilize the on-screen display capability of receiver 100. Recorder derived messages may be coupled via the control conductor of data bus 112 to receiver 100 for on-screen display insertion at block OSD 520 of FIG. 2. The recorder message data may be formatted as a text message by generator 270, to which a tag or label is appended. The tagged text message shown as signal 271 is coupled to controller 115 of IRD 100 for separation from other control bus data. Following separation the text message is coupled for display formatting and video insertion by OSD 520. The text message is generated responsive to OSD command signal CMD from controller 205. As described earlier, signal CMD may be subject to delay at block 207. However, the text message from block 270 may be delayed at an alternative point by switch A7 insertion of delay 207.

In a further inventive embodiment, receiver 100 includes a memory 510 which contains receiver on-screen display messages and OSD messages specific to recorder 200. Recorder specific messages may be accessed responsive to recorder on-screen display command signal, CMD, which may be coupled via the control bus to controller 115. In recorder 200 the on-screen display command signal CMD, is generated by controller 205 which in addition determines the message to be generated. Thus command signal CMD, may be advantageously coupled to receiver 100 to enable accessing and display formatting of recorder specific graphical messages stored in memory 510.

In yet another inventive arrangement receiver 100 may adaptively select between the recorder text message or a receiver graphical message responsive to a recorder command. The selection between the recorder text or IRD graphical message display permits the interconnection of recorders and receivers of differing ages having different features and facilities. For example, an older receiver may be connected to a recently manufactured recorder thus, the receiver memory may not contain preprogrammed graphical messages to support recorder on-screen message presentation. Thus the receiver may display the simple text message generated by the recorder. Conversely, a more modern receiver may be preprogrammed with selections of graphical messages for a variety of products of various manufactured ages and these various graphical messages may be displayed in place of the recorder text message. Selection between simple text or graphical message is facilitated by the tag or label which is appended to the text message. For example, the tag or label may contain the command signal CMD which selects, and enables the required recorder specific message. In addition the label may provide sufficient data capacity to communicate recorder profile information relating to, for example, the date of recorder manufacture, model, version or revision level and serial number. When the text message with tag or label is received by controller 115, the tag or label is interpreted which results in the selection of a recorder specific graphical message from IRD memory 510. However, if the receiver memory is not preprogrammed with the specified recorder message or with a message specific to the recorder profile, the tag enables formatting and display of the appended simple text message. As described previously a delay element may be inserted to compensate for temporal and spatial displacement between the OSD message, text or graphical, and the replayed decoded image.

Figure 3:
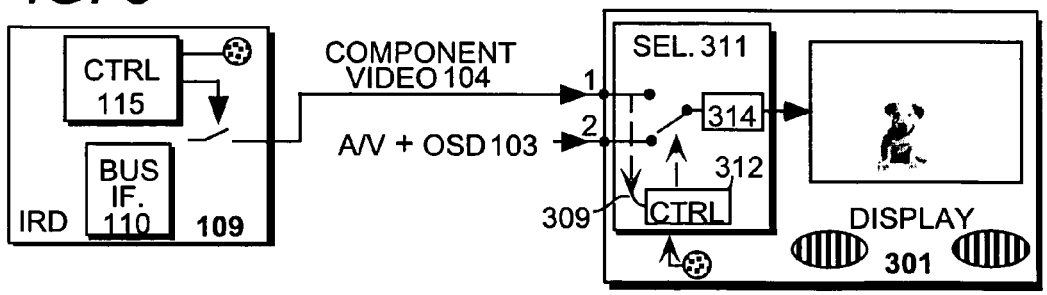
FIG. 3 is an exemplary block diagram showing a simplified switch including various inventive embodiments.

FIG. 3 illustrates the use of a reduced cost display, for example, as depicted as display 301. To reduce the display cost the number of signal inputs may be limited to, for example, an RF input, a component video or S-video input and one audio video signal input. The advantageous selection and bypass capability of selector 280 of FIG. 2, permits display 301 to monitor recorded, and non-recorded material via a single A/V input.

What is claimed is:

1. A digital television receiver, comprising:
   a signal receiver receiving a compressed digital television signal and a tag signal indicative of an operating mode of a reproduction apparatus from said reproduction apparatus, and generating a video signal for display from said compressed digital television signal;
   a memory storing a plurality of display messages; and,
   a controller coupled to said signal receiver and said memory, wherein said controller interprets said tag signal to select one of said stored display messages indicating said operating mode and combines said selected one of said stored display messages with said generated video signal for display, wherein, said tag signal includes data representative of a text display message and a command and said controller selects one of said stored display messages according to said command and if none of said plurality of said display messages can be selected according to said command, said controller combines said data representing said text display message in said tag signal with said generated video signal.

2. The digital television receiver of claim 1, wherein, said plurality of said display messages includes messages specific to said reproduction apparatus.

3. The digital television receiver of claim 1, wherein, said tag signal includes data for selecting a display message specific to said reproduction apparatus.

4. A receiving device coupled to a reproduction apparatus for receiving and decoding digital signals, comprising:
   a receiver having an input for receiving a digital video signal and first and second control signals from said reproduction apparatus;
   a decoder coupled to said receiver for decoding said digital video signal and generating a video display signal therefrom;
   a memory storing a plurality of display messages for said receiving device and for said reproduction apparatus; and,
   a controller receiving said first and second control signals and coupled to said memory for selecting display message data for combining with said video display signal, wherein responsive to said first control signal, said controller selects one of said stored display messages for said reproduction apparatus as said display message data, and absent said specific message data in said memory, said second control signal is used to produce a display message signal and said controller selects said display message signal as said display message data.

5. The receiving device of claim 4, wherein said plurality of display messages corresponds to a plurality of video signal sources.

6. The receiving device of claim 4, wherein said first control signal corresponds to a specific display message request.

7. The receiving device of claim 4, wherein said second control signal represents specific display message data.

8. The receiving device of claim 4, wherein said memory stores display message data specific to a digital recording and replay apparatus.

9. A method for displaying a display message and a video signal for a digital display device receiver comprising the steps of:
   receiving a compressed digital video signal and a tag signal indicating an operating mode of a reproduction apparatus from said reproduction apparatus;
   storing a plurality of display messages in a memory;
   selecting one of said plurality of said display messages responsive to said tag signal, said selected one display message indicative of said operating mode;
   decoding said received compressed digital video signal to produce a decoded video signal; and
   generating a video signal for display by combining the selected one of said plurality of said display messages with said decoded video signal, wherein said tag signal includes data representative of a text display message and a control command and said selecting step selects said one of said plurality of said display messages according to said control command and if none of said plurality of said display messages can be selected according to said control command, said generating step combines said data representing said text display message in said tag signal with the decoded video signal.

10. The method of claim 9, wherein said plurality of said display messages includes messages specific to the reproduction apparatus.

11. The method of claim 10, wherein said tag includes data for selecting a display message specific to the reproduction apparatus.

12. The method of claim 9, further comprising the step of synchronizing said selected one of said plurality of said display messages for display with said decoded video signal at the generating step.

13. The digital television receiver of claim 1, wherein said selected one of said plurality of said display messages is synchronized for display with said generated video signal.

* * * * *

UNITED STATES PATENT AND TRADEMARK OFFICE
CERTIFICATE OF CORRECTION

PATENT NO. : 7,599,603 B1
APPLICATION NO. : 09/649975
DATED : October 6, 2009
INVENTOR(S) : Blatter et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1270 days.

Signed and Sealed this

Twenty-eighth Day of September, 2010

David J. Kappos
*Director of the United States Patent and Trademark Office*